United States Patent
Deane et al.

[11] 3,898,638
[45] Aug. 5, 1975

[54] DIFFERENTIAL TEMPERATURE SENSOR SYSTEM AND IMPROVEMENTS IN A FLUID FLOW DETECTOR

[76] Inventors: Robert A. Deane, 22344 Mandell St., Canoga Park, Calif. 91304; Malcolm M. McQueen, 19430 Marilla St., Northridge, Calif. 91324

[22] Filed: Aug. 9, 1973

[21] Appl. No.: 386,962

[52] U.S. Cl. ............................ 340/243; 340/239 R
[51] Int. Cl.² ........................................ G08B 21/00
[58] Field of Search ...... 340/244 R, 239 R; 73/204, 73/295; 323/68; 338/30

[56] References Cited
UNITED STATES PATENTS

| | | | |
|---|---|---|---|
| 2,165,569 | 7/1939 | Obermaier | 340/239 R |
| 2,762,998 | 9/1956 | Talbott, Jr. | 340/244 R X |
| 2,861,159 | 11/1958 | Seney | 340/244 R UX |
| 2,924,972 | 2/1960 | Biermann | 73/204 |
| 3,118,136 | 1/1964 | Steele | 340/244 R |
| 3,366,942 | 1/1968 | Deane | 340/243 |
| 3,432,840 | 3/1969 | Neapolitakis et al. | 340/244 R |

Primary Examiner—John W. Caldwell
Assistant Examiner—Daniel Myer
Attorney, Agent, or Firm—John J. Posta, Jr.

[57] ABSTRACT

The improved system includes matched spaced sensor probes thermally connected to a heat source, each probe comprising a hollow closed casing with a heat sensor wire disposed in a potting compound support therein and means for interconnecting the sensor wire with a constant voltage source and means for detecting fluctuations in resistance of the wire in response to temperature changes between the probes. The casings, wires and accessory equipment are as closely matched as possible in positioning, geometry, chemical and physical composition and in physical and electrical properties so as to assure improved accuracy in having both probes exhibit the same resistance when exposed to the same temperatures or temperature transients.

The improved sensor system can be incorporated within and form improvements in a fluid flow detector. Such detector registers a variation of temperature between said probes in the absence of fluid flow adjacent to the probes.

10 Claims, 3 Drawing Figures

PATENTED AUG 5 1975

3,898,638

SHEET 1

DIFFERENTIAL TEMPERATURE SENSOR SYSTEM AND IMPROVEMENTS IN A FLUID FLOW DETECTOR

BACKGROUND OF THE INVENTION

A. Field of the Invention

The present invention generally relates to temperature sensing means and more particularly to differential temperature sensing systems adapted for use in fluid flow detectors and the like.

B. Description of Prior Art

Accurate temperature measurement is difficult in part due to the fact that heat can be transferred by three routes, conduction, radiation and convection. Moreover, accuracy is also affected by the thermal capacity of the detection means. Many conventional thermo-electric temperature transducers tend to heat up in use, further complicating the problem. In addition, electrical resistance wire-type temperature sensors may vary widely from sensor to sensor in their resistance relative to temperature, i.e., in the slope of a curve plotting electrical resistance against temperature. While means are available for compensating for such slope differences when employing a plurality of sensors on a given application, the compensating means may be expensive and complicated and/or introduce other problems in the detection system. Accordingly, it would be desirable to provide a simple, inexpensive temperature sensing system which would exhibit increased heat detection accuracy over a wide temperature range.

Temperature sensing systems have been used for a variety of purposes. One such system is employed in the flow stoppage indicator described and claimed in U.S. Pat. No. 3,366,942 issued Jan. 30, 1968 to Robert A. Deane. Such indicator employs a pair of heat sensing probes along with a heater probe thermally connected or interconnected therewith. Each sensing probe includes a hollow closed casing with a sensing wire disposed in the casing and connected to a constant voltage source and to means for detecting a temperature differential between the probes, as indicated by a difference in the electrical resistance of the probe wires. The sensing probes and heater probe are adapted to be introduced into a conduit through which matter flows. In the absence of flow, the sensing probes are at different temperatures because (as in one embodiment) of the closer location of the heater probe to one of the sensing probes than the other of said sensing probes. However, when any type of matter flows past the probes, heat is carried away and the temperature difference between the two sensing probes disappears. Such a fluid flow detector is reasonably accurate. However, it would be desirable to provide it with increased accuracy over a suitable temperature range and over various rates of temperature change.

SUMMARY OF THE INVENTION

The foregoing needs are satisfied by the improved differential temperature sensor system of the invention and by improvements in a fluid flow detector, substantially as set forth in the Abstract above. The improved sensor system features thermally matching two or more sensing probes, both with respect to the casing thereof and the internal contents thereof, including the sensing wire and accessories. Substantially improved, more accurate and more uniform response is obtainable with such a system. Moreover, the modified sensing probes can be incorporated into a differential temperature fluid flow detector such as that set forth in U.S. Pat. No. 3,366,942 to provide improvements in performance and accuracy over the art. Further details of the present invention are set forth in the following.

DESCRIPTION OF THE PREFERRED EMBODIMENT

Figure 1:
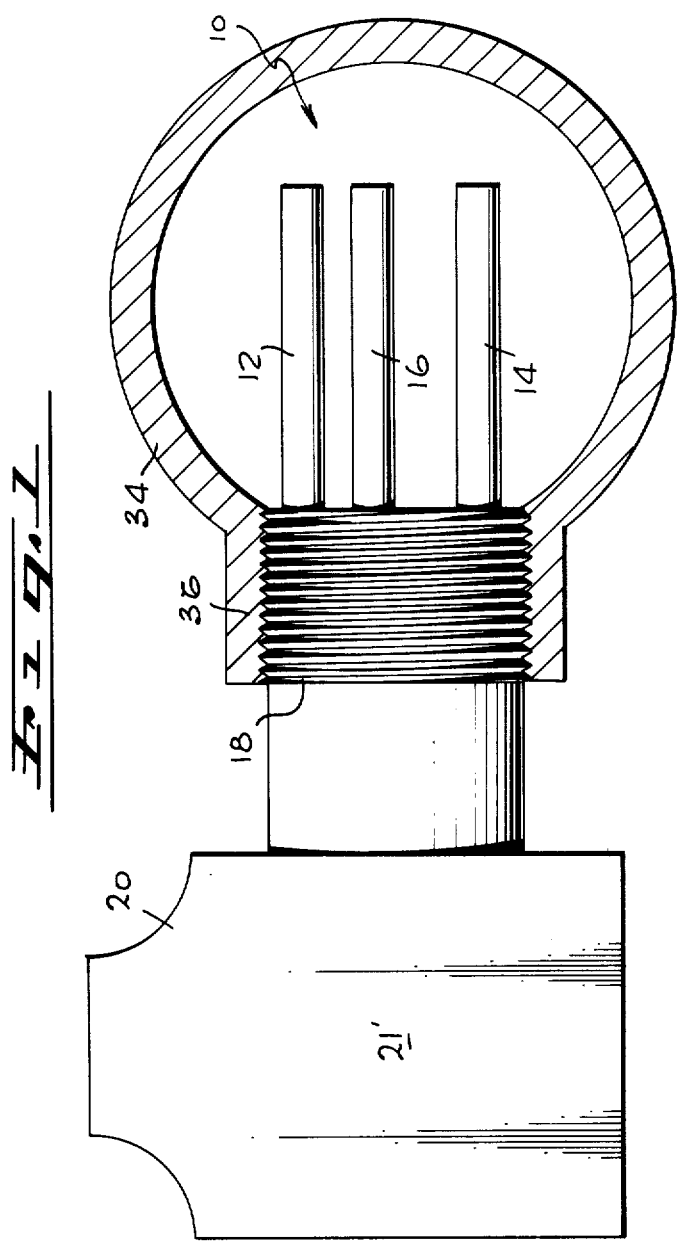
FIG. 1 is a schematic view, partly in section, illustrating one embodiment of a fluid flow detector incorporating improvements of the present invention.

Now referring more particularly to FIG. 1, one embodiment of the improved differential temperature sensing system of the invention is shown. Such system is designated by the numeral 10 and comprises a pair of spaced probes 12 and 14 matched to each other and thermally connected to a heat source in the form of a third probe 16. Probe 16 may contain any suitable heating element such as a resistive heating wire or the like connected to the media and a power source (not shown). Probe 16 is vertically below and may be spaced closer to probe 12 than to probe 14, creating a temperature differential there-between in the absence of exposure of probes 12 and 14 to heat-dissipating or equalizing flowing medium. It will be understood that, if desired, probe 16 could be equally spaced from probes 12 and 14 and that differential heating of probes 12 and 14 by probe 16 could be accomplished in part by, for example, a heat shunt running to probe 12 from probe 16. Thus, both convection and/or conduction in the medium at rest, and conduction in the shunt, carry heat differentially between the probes.

Probes 12, 14 and 16 are connected at one end to one end of an adapter head 18 threaded along a portion of its outer surface. Head 18 is connected at its opposite end to a housing 20. Housing 20, head 18 and probes 12, 14 and 16, together with accessory equipment, as described in U.S. Pat. No. 3,366,942, form a fluid flow detector 21.

Figure 2:
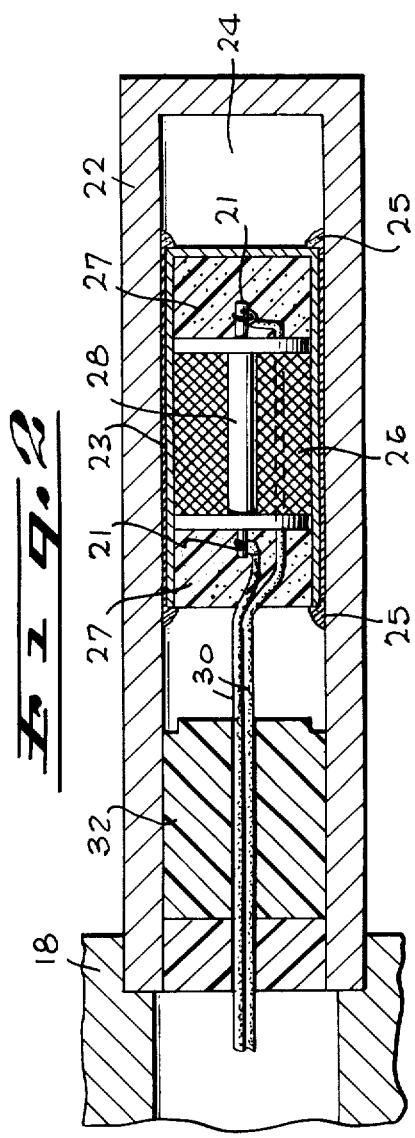
FIG. 2 is an enlarged schematic cross-section of an improved heat sensing probe utilized in a matched pair in FIG. 1.

As shown more particularly in FIG. 2, probes 12 and 14 each comprise a hollow closed outer casing 22 of a suitable heat conductive metal such as stainless steel, copper, or the like. Casing 22 has disposed within a central cavity 24 thereof a cup 23 made from an electrical insulating material having a high thermal conductivity. Cup 23 is secured to the interior of casing 22 by a thermally conductive adhesive material 25. Cup 23 has disposed therein a coiled heat sensor wire 26 of conventional material such as balco wire disposed about insulating spool 28. Wire 26 is connected, as by solder, welding, or the like, via terminal posts 21 to the pigtail ends of a pair of lead wires 30 encapsulated by potting compound 27 within cup 22a and supported in the desired central position via a thermally and electrically insulative collar 32. Lead wires 30 interconnect sensor wire 26 through head 18 and housing 20 with a constant voltage source 36 and with means 38 for detecting a change in the electrical resistance of wire 26, in response to temperature changes in the area external of and adjacent to probes 12 and 14.

Figure 3:
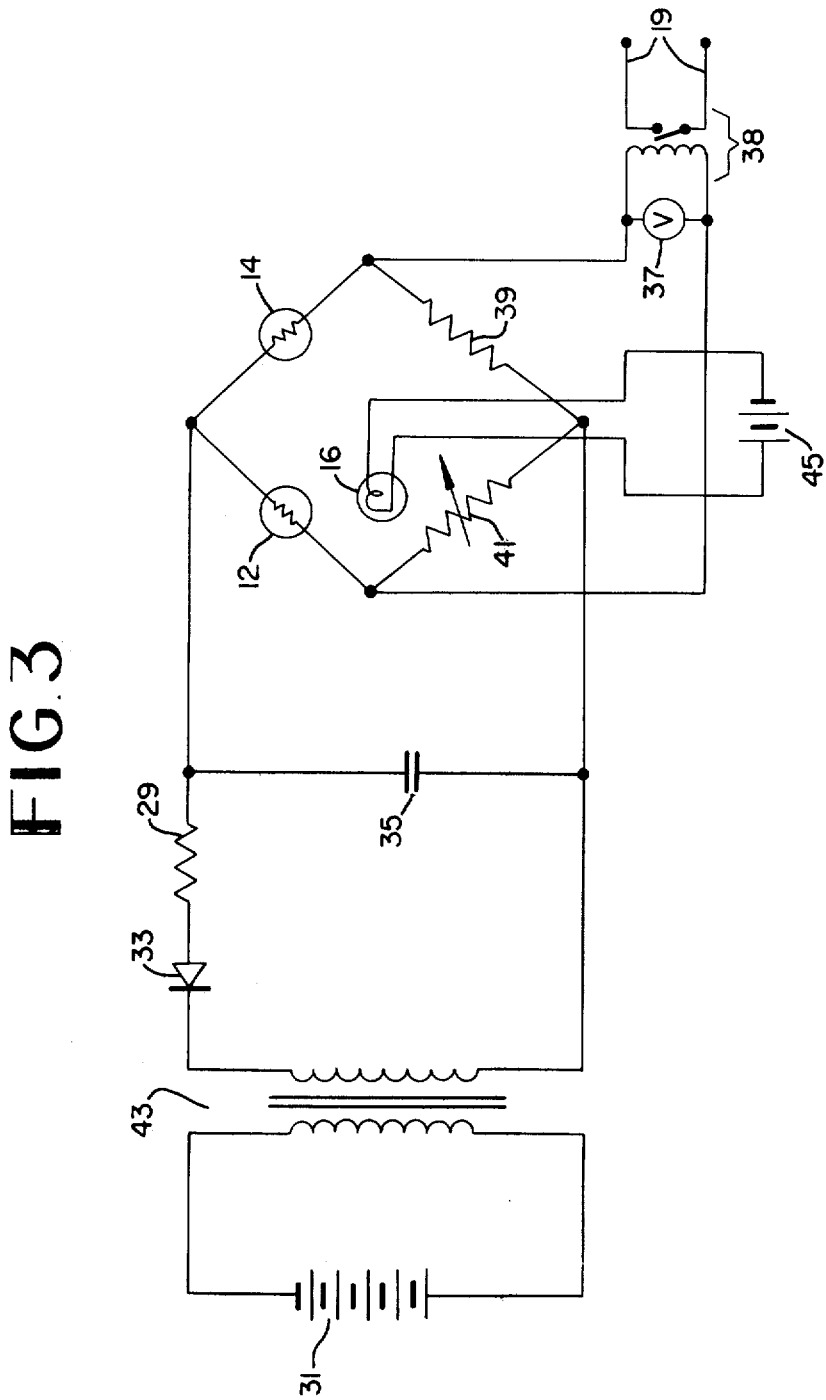
FIG. 3 is a simplified circuit diagram illustrating the basic electrical circuit of the subject invention.

FIG. 3 discloses an electrical circuit which might be used with the invention. Basically the circuit comprises a power source 31, which may be a conventional source of standard 110 volt alternating current or, with appropriate minor changes in circuit design, direct current; a common line isolation transformer 43; and a typical rectifier 33 of the vacuum tube or gas filled type or, preferably, a semi-conductor diode type, which, acting through resistor 29, serves to rectify the high frequency pulses and thereby charge condenser 35 with a fixed polarity. A Wheatstone bridge is formed in the circuit and includes the resistance wire temperature sensor of probes 12 and 14 balanced against fixed resistance 39 and variable resistance 41, respectively. A voltmeter 37, galvanometer, ohmmeter, or other suitable current detecting or measuring device may be connected across the bridge to give a visual indication when the bridge becomes unbalanced, or across thermistor 14 to measure directly the temperature of the material in which it is immersed. In addition, if desired, a relay switch 38 likewise may be connected across the bridge. Leads 19 from the relay switch 38 may be connected to any desired auxiliary warning device, such as a light or alarm, or to a secondary operational circuit, such as one activating a standby pump or automated valve system or the like. A separate source of current for heater 16 is shown; however, source 31 may be used for this heater with little or no adaptation.

In operation with the detector in place in pipe 34 and with the material flowing the detector circuit is connected to the power sources 31 and 45 and the Wheatstone bridge balanced by means of variable resistance 41.

In the embodiment shown in FIG. 1, probes 12, 14 and 16 extend into, for example, a fluid flow path in a pipe 34 and are held in position by connection to head 18. Head 18 releasably is threaded into an internally threaded pipe coupling 36 integral with pipe 34, as shown in FIG. 1, or comprising a separate component secured to pipe 34. In such position, when fluid is not flowing through pipe 34, a temperature differential exists between probe 12 and probe 14, due to the heat output of probe 16 and its aforesaid spaced relationship to probe 12. Utilizing circuitry more particularly described in FIG. 3, such temperature differential can be detected as a difference in current between probes 12 and 14 and can be used to actuate a light or other signaling means to show fluid flow stoppage. When fluid is flowing in pipe 34, however, the temperature difference at probes 12 and 14 disappears, due to the temperature-equalizing or heat-dissipating effect of the fluid flowing past probes 12 and 14. Accordingly, the current in probes 12 and 14 is the same, and flow stoppage signaling means are inactivated.

Improvements have been made, in accordance with the present invention, in probes 12 and 14 in order to assure proper thermal matching of these probes for maximum accuracy. Thus, differences in the extent of thermal dissipation or absorbtion between the casings 22 and their surroundings are minimized by having the external surface of each casing smooth and with the same finish and having the length, external diameter and other geometry, as well as the chemical composition of the casings 22 substantially thermally identical. Moreover, by locating each wire 26 in the same position and making each cup 23 the same size and placing it at the same thermal location within cavity 24 in each sensor probe (12 and 14), and by having the size and shape of cavity 24 the same in each casing 22 and a snug fit and thermally conductive material 23 between cup 23 and casing 22, external and internal heat transfer and thermal transient effects are made the same for probes 12 and 14. Moreover, cup 23 and wire 26 are longitudinally located such that when the dissipation effects of flowing fluid are at a minimum (i.e., flow has stopped), the heating effect from the heater 16 will cause maximum resistance change in wire 26 in probe 12.

In addition, cup 23 in each casing 22 is located at the same thermal point in order to assure that the cooling or heating of each wire 26 by the fluid medium in pipe 34 will be the same. Moreover, each cup 23 is of the same size and shape and fabricated and uniformly filled of the same type of encapsulating potting compound well known in the art.

In order to assure that the same relative electrical resistance is demonstrated by wires 26 over a wide temperature range, wires 26 are, in the preferred form, preselected from adjacent lengths of the same wire source (coil or the like). Accordingly, wires 26 have the same chemical and physical composition, diameter and physical (including thermal) and electrical properties.

Additional steps have been taken to assure that probes 12 and 14 will be properly matched. In this regard, lead wires 30 are centrally held within casings 22, by means of collars 32, as previously described. If, instead, wires 30 were allowed to position themselves at will within casings 22, they would act as heat flow paths having different characteristics. Wires 30 in probe 12 might, for example, touch casing 22 thereof while wires 30 in probe 14 might not, leading to a difference in the rate of heat flow in probe 12, as opposed to probe 14, so as to produce differences in the resistance exhibited by wires 26 during fluid flow and in the absence thereof (dynamic and static states).

Another step which increases the improved accuracy of system 10 is to make sure that the geometry of cups 23 is the same and the inner diameter of casings 22 is the same. Cups 23 should be closely slideably fitted within casings 22 and, in the preferred form, heat transfer sealant, such as thermally conductive material 25, or other heat transfer medium, of the same amount and type for each probe (12 and 14) may be placed between cup 23 and casing 22 in each of probes 12 and 14 at the same location therein to fill all voids between the inner wall of casing 22 and cup 23 and provide the same uniform low resistance heat path for probes 12 and 14. Moreover, each cup 23 should be voidless so as to assure uniform heat storage or thermal capacitance for probes 12 and 14.

As a further step to assure matching of sensor probes 12 and 14, equal quantities of the same composition of solder, lead wires and other accessory materials are used in probes 12 and 14. Alternatively, the lead wires may be welded to wire 26. Moreover, such materials are utilized, as near as possible, in the same size and shape for both probes 12 and 14.

Accordingly, matching probes 12 and 14 exhibit improved accuracy over thermal sensing probes heretofore provided. It will be understood that improved thermal sensing system 10 can provide the sensing units thereof in a form other than as probes, so long as the constituents thereof and the criteria for their assembly as set forth for probes 12 and 14 are followed.

It should also be noted that in the flow detector of FIG. 1, and in comparable equipment operating with the novel probes of the invention and utilizing the differential temperature concepts described herein, it is not necessary to be able to read precisely the actual temperature of the flow medium. Instead, it is essential that probes 12 and 14 show the same electrical resistance when exposed to the same temperature during fluid flow, regardless of what that temperature is, and that probes 12 and 14 show the same decreases and increases in electrical resistance as the temperature of the fluid medium fluctuates. With the present novel differential temperature sensor system, one can promptly and accurately detect a temperature change in response to flow stoppage because the improved fluid flow detector incorporating the above improvements produce substantially the same instantaneous or steady state signals of temperature difference, if any, over a wide range of fluid temperatures.

Various changes and modifications can be made in the present differential temperature sensor system and its components and in the improvements in a fluid flow indicator as set forth herein and in components thereof. All such changes and modifications as are within the scope of the appended claims and form part of the present invention.

What is claimed and desired to be secured by Letters Patent Is:

1. An improved differential temperature sensor system, which system comprises a plurality of spaced probes thermally connected to a heat source probe, said spaced probes and heat source probe adapted for insertion into a flow path, running substantially perpendicular to each of said probes, each of said spaced probes comprising:
  a. a hollow closed casing defining a central cavity;
  b. a heat sensor wire disposed on a support block within said cavity;
  c. means for interconnecting said wire with a power source and with means for detecting fluctuations in resistance of said wire with temperature, each of said casings and the components therein being essentially identical in construction so as to have substantially the same thermal length, external surface finish, external and internal diameter geometry and composition, whereby said system exhibits improved thermal accuracy.

2. The improved system of claim 1 wherein said support block is positioned at the thermally optimum location in said cavity of each said casing and wherein each said wire is located in the same position in each said block.

3. The improved system of claim 2 wherein said wires are of essentially the same chemical and physical composition, diameter, length and geometry and physical and electrical properties, having been preselected from adjacent lengths of a source wire and wherein all of said support blocks comprise the same type and quantity of solidified potting compound and are of substantially the same size and shape.

4. The improved system of claim 3 wherein said block is dimensioned to closely slideably fit within the inner wall of said cavity and the space therebetween is filled with the same thermally conductive medium.

5. The improved system of claim 4 wherein each said probe contains lead connecting means and lead wires of substantially the same amount, geometry and type and wherein said lead wires are supported substantially in the center of said casing.

6. In a fluid flow detector comprising a plurality of spaced temperature sensing probes, each having a hollow casing containing a heat sensor wire in the cavity therein, a heating source probe thermally connected with each of said sensing probes to provide said probes with different temperatures in the absence of fluid flow adjacent said probes, means for imposing a constant voltage on said sensing sensor wires and for detecting changes in electrical resistance thereof in response to temperature changes therein, the improvement which comprises having said casings and the components therein substantially matching in thermal length, external surface finish, external and internal diameter, geometry and composition, whereby said detector has improved thermal accuracy.

7. The improvements of claim 6 wherein each said wire is disposed on a support block positioned at the same thermal location in said cavity of each casing and wherein each said wire is located in the same position on each said block.

8. The improvements of claim 7 wherein said wires are of essentially the same chemical and physical composition, diameter, length and geometry and physical and electrical and thermal properties, and wherein each said block comprises the same type and quantity of solidified potting compound and is the same thermal size and shape.

9. The improvements of claim 8 wherein each said block is dimensioned to closely slideably fit within the inner wall of said cavity and the space therebetween is filled with the same thermally conductive medium.

10. The improvements of claim 9 wherein each said probe contains lead wire connecting means and lead wires of the same thermal amount, geometry and type, and wherein said lead wires are centrally supported within said casing.

* * * * *